US008783884B2

(12) United States Patent
Baker et al.

(10) Patent No.: US 8,783,884 B2
(45) Date of Patent: Jul. 22, 2014

(54) DISPLAY DEVICE FOR DISPLAYING TWO GRAPHICS

(75) Inventors: Mark Baker, Essex (GB); Dan Gullick, Chelmsford (GB)

(73) Assignee: Visteon Global Technologies, Inc., Van Buren Township, MI (US)

( * ) Notice: Subject to any disclaimer, the term of this patent is extended or adjusted under 35 U.S.C. 154(b) by 366 days.

(21) Appl. No.: 13/366,997

(22) Filed: Feb. 6, 2012

(65) Prior Publication Data

US 2012/0200475 A1 Aug. 9, 2012

(30) Foreign Application Priority Data

Feb. 8, 2011 (GB) .................................. 1102161.5

(51) Int. Cl.
*H04M 1/22* (2006.01)
*H01H 9/18* (2006.01)
*G09F 13/06* (2006.01)
*H01H 13/83* (2006.01)

(52) U.S. Cl.
CPC ............... *H01H 9/182* (2013.01); *H01H 9/181* (2013.01); *G09F 13/06* (2013.01); *H01H 2219/0621* (2013.01); *H01H 13/83* (2013.01)
USPC .................. 362/23.05; 362/23.03; 362/23.09; 362/23.1; 200/313; 200/314

(58) Field of Classification Search
CPC ....... H01H 9/181; H01H 9/182; H01H 9/185; H01H 2219/039; H01H 2219/054; H01H 2219/062; H01H 2219/0621; H01H 2219/036; H01H 2009/18; H01H 2009/182; H01H 2009/183; H01H 2009/187; H01H 13/83; G09F 13/06; G09F 13/08
USPC ....................... 362/23.04, 23.05, 23.07–23.1, 362/559–560, 23.16; 200/313–314
See application file for complete search history.

(56) References Cited

U.S. PATENT DOCUMENTS 7,905,627 B2 * 3/2011 Chiang et al. ................. 362/237
2009/0161388 A1 6/2009 Kato et al.

FOREIGN PATENT DOCUMENTS

FR 2928223 3/2008
GB 238748 11/2007
JP 2008015122 7/2006

OTHER PUBLICATIONS

Intellectual Property Office of the United Kingdom; Combined Search and Examination Report for Patent Application No. GB1102161.5 filed Feb. 8, 2011 (Date of Report: Jun. 6, 2011).

*Primary Examiner* — Robert May
(74) *Attorney, Agent, or Firm* — Klintworth & Rozenblat IP LLC

(57) ABSTRACT

A display device for displaying two graphics is provided. The display device has first and a second light transmitting substrates, each having a front surface and a rear surface, the first substrate including at least one etched region corresponding to a first graphic, and the second substrate including at least one etched region corresponding to an inverse or negative of the first graphic. The display device also has first and second light sources arranged to emit light into the first and second substrates. The first substrate conveys the light to the etched region(s) of the first substrate which then scatters light towards the user. The second light source is behind the second substrate and emits light through both substrates towards the user. When the first light source is illuminated only the first graphic is displayed, and when the second light source is illuminated only the second graphic is displayed.

15 Claims, 2 Drawing Sheets

DISPLAY DEVICE FOR DISPLAYING TWO GRAPHICS

CROSS-REFERENCES TO RELATED APPLICATIONS

The Present Application is based on and claims the benefit of priority from United Kingdom Patent Application Serial No. 1102161.5 entitled "DISPLAY DEVICE FOR DISPLAYING TWO GRAPHICS" and filed on Feb. 8, 2011, the contents of which are hereby incorporated by reference in their entirety to the extent permitted by law.

FIELD OF THE INVENTION

This invention relates to a display device for displaying two graphics. In particular this invention relates to a display device for use in a movable control, for example a button, switch or knob, which may be used in a motor vehicle.

BACKGROUND

Push buttons are used on a variety of interfaces for controlling many different functions. Typically, each button is labeled with text, a symbol or some other visual indicator to indicate the specific function or state of activation. In this specification, any such text, symbol or visual indicator is referred to as a "graphic". The graphic may then be controllably displayed when the button is pressed by a user, for example with back lighting being switched on or off to indicate, respectively, the activation or deactivation of some function.

In applications in which it is required or desirable to have a large number of different controls, a problem can arise if the number of buttons needed exceeds the space available while still having buttons large enough for ease of use.

A solution to this problem is to provide two different graphics on each button, with each graphic being associated with a different function. In this way, when the button is configured to perform a first function, a first graphic is displayed, and when the button is configured to perform a second function, a second graphic is displayed. However, another problem then arises regarding how to selectively display to the user only one of the two graphics at a given time, while concealing the unused graphic.

Some known solutions to this problem use color filters associated with each of the graphics in combination with two or more separate light sources providing two colors of illumination. By changing the illumination color, the graphic that is displayed to the user may be changed. However, with this method, there is a limit to the colors that can be chosen as they must be sufficiently different in wavelength for the filters to work to exclude one of the two graphics.

To enable each of the graphics to be more clearly distinguished, many prior art displays provide the graphics adjacent to each other, so that the presence of a first of the graphics does not alter the appearance of a second graphic even when only one of the graphics is illuminated. However, providing the graphics in this arrangement inevitably requires a button with a larger surface area than if the graphics overlapped.

It is an object of the present invention is to provide an improved means of displaying more than one graphic on a single display area, which may be a fixed display area or part of a movable control such as a button.

SUMMARY OF THE INVENTION

According to one aspect of the invention, there is provided a display device for displaying two graphics, the display device includes a first light transmitting substrate having a front surface and a rear surface, and the first light transmitting substrate including, on its rear surface, at least one etched region corresponding to a first graphic to be displayed, a second light transmitting substrate located behind and spaced apart from the first light transmitting substrate, the second light transmitting substrate having a front surface and a rear surface, and the second light transmitting substrate including, on its front surface, at least one etched region corresponding to a negative of the first graphic, a first light source arranged to emit light into the first light transmitting substrate such that the first light transmitting substrate acts as a light pipe conveying said emitted light within the first light transmitting substrate to said at least one etched region, a second light source positioned behind the second light transmitting substrate and arranged to emit light through the first and second light transmitting substrates towards a viewer of the display, and a mask layer comprising at least one opaque region, said at least one opaque region defining at least one light transmissive region corresponding to a second graphic to be displayed, the mask layer being provided between the second light source and the rear surface of the first light transmitting substrate. In use, when the first light source is illuminated and the second light source is not illuminated, light conveyed within the first light transmitting substrate is incident on said etched region(s) on the rear surface of the first light transmitting substrate and is directed out of the front surface of the first light transmitting substrate thereby displaying only the first graphic to a viewer of the display, and when the second light source is illuminated and the first light source is not illuminated, light emitted by the second light source is blocked by said opaque region(s) of the mask layer and passes through said light transmissive region(s) and through the first and second light transmitting substrates thereby displaying only the second graphic to a viewer of the display, said passed light also passing through either the etched region(s) on the rear surface of the first light transmitting substrate or through the etched region(s) on the front surface of the of the second light transmitting substrate so that the first graphic is concealed when the second graphic is displayed.

In this patent specification, the terms "front" and "forwards" are used with respect to features which are relatively closer to or which are directed towards a user viewing of the display graphics. Similarly, the terms "rear" or "rearwards" are used with respect to features which are relatively farthest from or which are directed away from a user viewing the display graphics In a preferred embodiment of the invention, the first light transmitting substrate and the second light transmitting substrate have substantially the same thickness between respective front and rear faces or surfaces of the substrates.

Also in a preferred embodiment, the first light transmitting substrate and the second light transmitting substrate are spaced apart with an air gap.

It is particularly advantageous if the etched regions of the first light transmitting substrate and second light transmitting substrate are non-wavelength selective.

The etched regions of the first light transmitting substrate and of the second light transmitting substrate may be areas of roughened surface.

The first light transmitting substrate is preferably transparent to the light from both the first light source and the second light source. Similarly, the second light transmitting layer is preferably transparent to the light from the second light source. If, however, the light from one or the other of the light sources is broad band, for example, white light, then one or another of the substrates may be colored, that is, transparent to particular wavelengths of light, so that the displayed graphic assumes the color of the one colored substrate.

Preferably the mask layer is located between the front surface of the second light transmitting substrate and the rear surface of the first light transmitting substrate.

More preferably, the mask layer comprises at least one opaque region on the front surface of the second light transmitting substrate, provided by a layer on a region of the front surface of the second light transmitting substrate, so that a separate mask substrate is not required.

In a preferred embodiment, the mask layer comprises opaque printed regions on the front surface of the second light transmitting substrate. The mask layer has at least one opaque region that has a shape which corresponds to an inverse of, or a negative of, the shape of a second graphic to be displayed. The second light transmitting substrate also has on the same front surface etched regions having a shape corresponding to the shape of an inverse of, or a negative of, the etched region (s) forming the first graphic. In a preferred embodiment of the invention, the mask layer overlies some (but not all) of the etched region on the front surface of the second light transmitting substrate.

The, or each, opaque region is preferably black, not just so that this blocks any wavelength of light emitted by the second light source, but also so that the opaque region absorbs any incident light coming from ambient external light that strikes the display device. This helps to conceal the appearance of the layer forming the inverse of the second graphic to a user of the device when ambient external light, for example sunlight, falls on the display device.

In a preferred embodiment of the invention, both substrates are planar, although it may be possible for the substrates to be curved to some degree, which may be desirable if the display device is to be used in a curved button, or behind a curved display panel or fascia. Preferably, the first and second light transmitting substrates are parallel. In some embodiments it may be desirable to provide a first light transmitting substrate that is planar and which is connected to a light pipe extending perpendicularly to the first light transmitting substrate for conveying light from the first light source to the first light transmitting substrate.

The display device may further comprise a supporting frame for supporting both the first light transmitting substrate and the second light transmitting substrate. Preferably the supporting frame defines a pyramidal space behind the second light transmitting substrate, and the second light source emits light into the apex of the pyramidal space, such that the second light transmitting substrate is illuminated evenly by the second light source.

Preferably, the display device further comprises a transparent or smoked cover in front of the first light transmitting substrate.

Preferably, the first and second light sources are light emitting diodes (LEDs), due to their generally small size and low power consumption compared to other light sources.

To control the illumination of the light sources, the first and second light sources are preferably mounted on a common circuit board. More preferably, the circuit board is located behind the second light transmitting substrate.

The invention further provides a push button including a display device, the display device being according to the invention. In this embodiment, the first and second graphics may correspond to two different functions of the push button.

BRIEF DESCRIPTION OF THE DRAWINGS

The invention will now be further described, by way of example only, and with reference to the accompanying drawings, in which.

DETAILED DESCRIPTION

Figure 1:
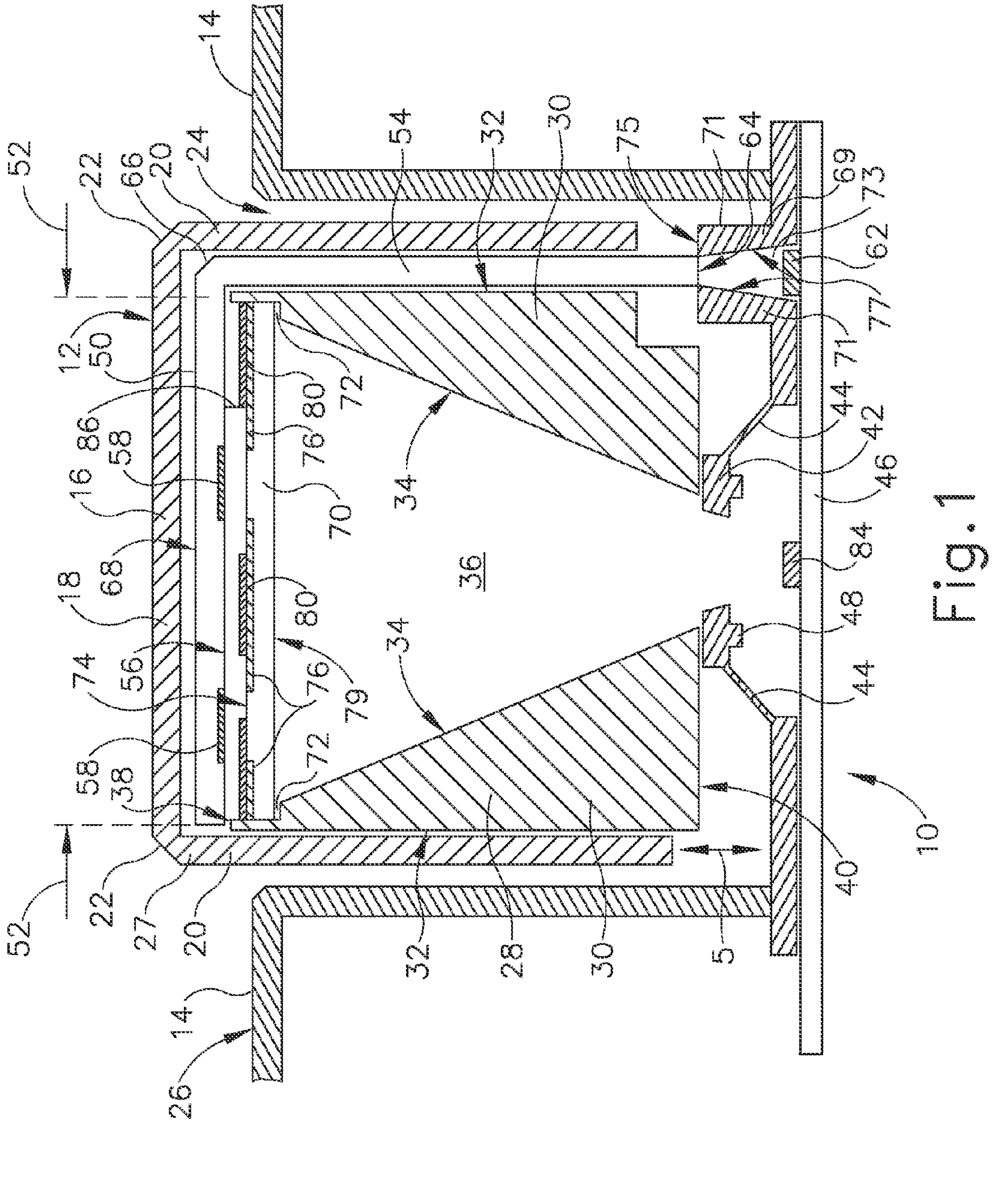
FIG. 1 depicts a cross-section of a display device incorporating a dual graphic push button according to a preferred embodiment of the present invention.

FIG. 1 depicts a display device 10 in accordance with a preferred embodiment of the present invention. The display device 10 is arranged to display either one of two graphics on a push button 12 depending on a selected function of the button 12, which in turn determines an illumination state to selectively illuminate one or the other of the graphics.

In this example, the push button 12 is mounted within a fixed housing 14 that may, for example, form part of a motor vehicle dashboard. The push button 12 comprises a cover 16 that shields the components of the display device 10 from a user of the button 12. The cover 16 when pressed by a user is movable relatively forwards and rearwards, as indicated by arrow 5. The cover 16 has a generally square front face or side 18 and four similar side walls 20, each of the side walls 20 extending perpendicularly from a respective edge 22 of the front face 18. The front face 18 is transparent, smoked or at least partially translucent as will be described in detail later.

The side walls 20 are at least partially received within an aperture 24 in the housing 14 so that the front face 18 of the cover 16 lies in a plane parallel to but offset from a front surface 26 of the housing 14 and so that a front portion 27 of the cover 16 protrudes from the housing 14.

The push button 12 further includes a supporting frame 28 located behind and within the cover 16. In this embodiment, the supporting frame 28 has a substantially square cross-sectional area and comprises four integrally formed side walls 30, each of which has a similar shape. Each of the side walls 30 comprises an outer face 32 lying in a plane parallel to a respective side wall 20 of the cover 16 and an inner face 34 which is inclined at an angle to the respective outer face 32. In this way, each of the side walls 30 has a generally triangular cross-sectional shape and the four inner faces 34 define a pyramidal space 36 through the center of the frame 28. The inner faces 34 are angled such that the opening in a front face 38 of the frame has a larger area than the opening in a rear face 40 of the frame 28.

The rear face 40 of the supporting frame 28 is in contact with one or more pressure pads 42 where the rear face joins each of the inner faces 34. Each pressure pad 42 is mounted on resilient arms 44 that hold the pressure pad 42 at a distance from a circuit board 46 that is mounted behind the housing 14.

To operate the push button 12, a user presses his finger or thumb against the front face 18 of the cover 16 and pushes the cover 16 further into the aperture 24. This forces the supporting frame 28 against each pressure pad 42 and urges each pressure pad 42 towards the circuit board 46. A contact point 48 on each of the pressure pads 42 makes contact with the circuit board 46 when the button cover 16 is pressed 5 and completes the required circuit depending on the selected function of the push button 12.

The push button 12 is designed to have two different functions depending on the specific status of the circuitry at any given time. As such, the button 12 is designed to selectively display one or the other of two different graphics, referred to herein as a first graphic and a second graphic, each of which when illuminated is visible through the front face 18 of the cover 16 of the button 12, to indicate the current function of the button 12.

To display graphics in this way, the push button 12 comprises a first light transmitting layer or substrate 50, which in this embodiment comprises a planar light pipe 50, positioned forwards of the supporting frame 28 and inside the cover 16. The first light transmitting substrate 50 extends fully across a display area 52 and is located between the front face 38 of the supporting frame 28 and the front side 18 of the cover 16 The first light transmitting substrate 50 is connected at one edge of the display area 52 to a light pipe stem portion 54, that extends perpendicularly rearwards away from the display area 52, and which is located between one of the side walls 30 of the supporting frame 28 and one of the side walls 20 of the cover 16.

The first light transmitting substrate 50 and the light pipe stem portion 54 are formed as a single piece in a clear, transparent material, for example by molding in poly(methyl methacrylate) (PMMA) or polycarbonate.

The first substrate 50 has a thickness defined by the spacing between front and rear faces or surfaces 68, 56 of the substrate. The rear surface 56 of the first substrate 50 includes at least one etched region 58. Depending on the material chosen for the substrate 50, the etched regions 58 may be formed by: chemical etching, for example by using an acid or a solvent; physical etching, for example by sand blasting; or laser etching. The etching is preferably a surface roughness or texturing, so that the thickness of the substrate is substantially equal in both etched and non-etched regions.

Figure 2:
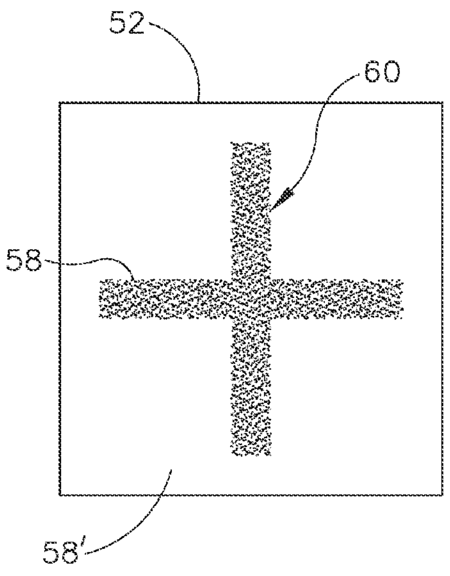
FIG. 2 depicts an example of a first graphic that may be displayed on the button of FIG. 1.

The etched region 58 corresponds to a first graphic 60 to be displayed, an example of which is shown in FIG. 2. In FIG. 2, the etched region 58 is in the shape of a plus sign. In general, the etched regions 58 within the bounds of the display area 52 will be bounded by at least one un-etched region 58', which in the example of FIG. 2 is the inverse or negative of the shape of the etched region 58.

A first light source 62, which in this embodiment is a light emitting diode (LED) 62, is positioned proximate a free end 64 of the light pipe stem portion 54. When illuminated, the LED 62 emits light into the end 64 of the light pipe stem portion 54, which has smooth, internally reflecting walls. The emitted light is conveyed within the light pipe stem portion 54 towards the first light transmitting substrate 50 by total internal reflection and is then directed into the display area 52 of the first light transmitting substrate 50 by means of internal reflection off an angled face 66 at the junction between the light pipe stem portion 54 and the first light transmitting substrate 50. Apart from the etched area or areas 58, the first light transmitting substrate 50 also has smooth internally reflecting front and rear surfaces 68, 56, and so light is conveyed by total internal reflection throughout the first light transmitting substrate 50.

The (or each) etched region 58 has a roughened texture which acts to scatter light that is internally incident from within the first light transmitting substrate 50 on the etched region 58. In the display area 52, some of the internally conveyed light is internally incident on the etched region 58 on the rear surface 56 of the first light transmitting substrate 50. This internally incident light is scattered in all directions by the surface roughness of the (or each) etched region 58, with some light being lost from the view of the user as this is scattered in a rearwards direction out of the first light transmitting substrate. Because the substrate is transparent, almost none of the light internally incident on the etched area 58 is absorbed by the etched area. Therefore, the remainder of the light incident on the etched area is scattered forwards within the bulk of the first light transmitting substrate towards the front surface 68 of the first light transmitting substrate 50. The front surface 68 of the substrate 50 is a smooth, transparent surface extending across the full extent of the display area 52. Some of the forwards scattered light will have a high internal angle of incidence (measured with respect to a normal to a surface), and will remain trapped by total internal reflection within the light pipe formed by the first light transmitting substrate 50, but some of the forwards scattered light will have an internal angle of incidence that is low enough so that this light will be transmitted out of the front surface 68 of the first light transmitting substrate 50. The light emitted from the first light transmitting substrate 50 then passes through at least one translucent or transparent region of the front face 18 of the cover 16 such that the first graphic 60 is visible to a viewer of the display device 10.

The un-etched areas 58' then remain substantially dark or un-illuminated, as the first graphic 60 is viewed by a user of the display device 10.

The skilled person will realize that the front face 18 of the cover 16 need not, of course, be fully transparent, and in a preferred embodiment of the invention this is smoked, i.e. colored with a neutral density dye which absorbs much of the external ambient light incident on the display unit 10 so as to substantially conceal the internal structure of the display unit from the view of the user.

In this embodiment, the first light source 62 is mounted on the circuit board 46. To accommodate movement of the button 12, for example when it is pressed, a screen member 69 is provided around the light source 62. The screen member 69 comprises wall portions 71 extending substantially perpendicularly from the surface of the circuit board 46. A spacing 73 between the wall portions 71 is, at its smallest, approximately equal to a width of the light pipe stem portion 54 so that the end 64 of the stem portion 54 is received between the wall portions 71. The height of the wall portions 71 is such that when the button 12 is in an un-pressed state, the end 64 of the stem portion 54 is within the spacing 73 at or proximate an upper end 75 of the wall portions 71. When the button 12 is in a pressed state, the end 64 of the stem portion 54 moves down within the spacing 73 towards the light source 62.

In this embodiment, inner surfaces 77 of the wall portions 71 are angled so that the spacing 73 is tapered towards the upper end 75. As such the light emitted by the light source 62 is directed into the end 64 of the light pipe stem portion 54.

The push button 12 further comprises a second light transmitting layer or substrate 70, which extends fully across the display area 52. The second substrate has a thickness defined by the spacing between front and rear faces 74, 79 of the substrate. The thickness of the second substrate 70 is the same as that of the first substrate 50. The second light transmitting substrate 70 is located behind the display area 52 of the first light transmitting substrate 50, and in this embodiment the second light transmitting substrate 70 is located in a ledge 72 in the front face 38 of the supporting frame 28. As such, the second light transmitting substrate 70 fits within and covers the opening in the front face 38 of the supporting frame 28.

The second light transmitting substrate 70 is preferably formed in the same clear, transparent material as the first light transmitting substrate 50, for example by molding in poly (methyl methacrylate) (PMMA) or polycarbonate.

Figure 3:
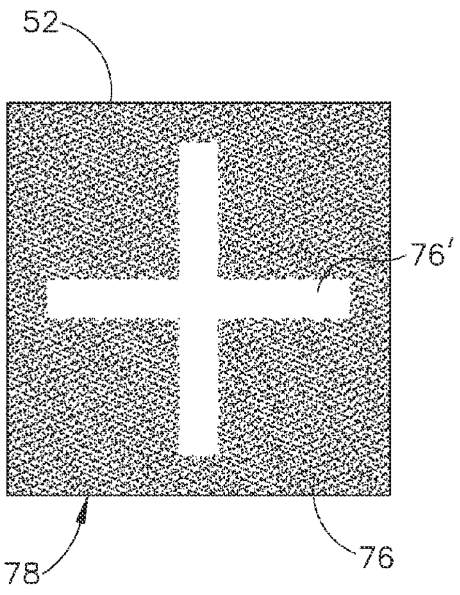
FIG. 3 depicts an inverse of the first graphic of FIG. 2.

The front surface 74 of the second light transmitting substrate 70 includes one or more etched regions 76 corresponding to an inverse or negative 78 of the first graphic 60, as shown in FIG. 3. The, or each, etched region 76 the second light transmitting substrate 70 within the bounds of the display area 52 therefore bounds one or more un-etched regions 76' which have the same shape as the first graphic 60.

Depending on the material chosen for the substrate 70, the etched regions 76 may be formed by: chemical etching, for example by using an acid or a solvent; physical etching, for example by sand blasting; or laser etching.

The, or each, etched region 76 of the second light transmitting substrate 70 is provided on the front surface 74 of the second substrate, and the, or each, etched region 58 of the first light transmitting substrate 50 is provided on the rear surface 56 of the first substrate. The benefit of this arrangement is that it is possible to bring the respective planes of the etched regions 58, 76 into close proximity, and so minimize parallax effects, as will be explained in more detail below.

Figure 4:
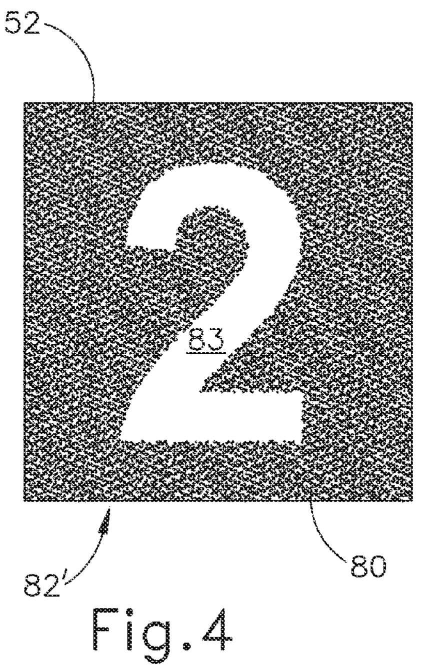
FIG. 4 depicts an inverse of a second graphic that may be displayed on the button of FIG. 1.
Figure 5:
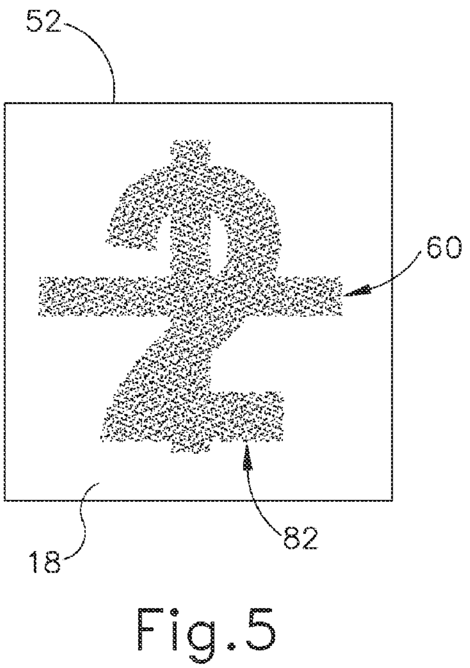
FIG. 5 depicts overlapping first and second graphics.

The display device 10 further comprises a mask layer 80 with a shape corresponding to an inverse 82' of the shape of a second graphic 82 to be displayed, which in this example is a numeral "2" as shown in FIGS. 4 and 5. The mask layer 80 forms at least one opaque region which, in this embodiment, is a contiguous printed region 82' on the front surface 74 of the second light transmitting substrate 70 having the inverse or negative shape of the numeral "2". The mask thereby defines a non-printed region or area 83 on the front surface 74 of the second light transmitting substrate 70. The non-printed area is a transparent region 83 in the shape of the second graphic 82. Light can then shine through the non-printed area 83 to display the second graphic 82.

The mask layer 80 and etched region(s) 76 of the second light transmitting substrate 70 are provided on the same side of the second substrate, with the mask layer 80 overlying the etched region(s) 76. The benefit of this is that the etched region(s) 76 behind the mask layer are then completely hidden from view with respect to the viewer of the display device 10. At the same time, the image provided of the second graphic 82 provided by the mask layer 80 will be sharply defined owing to the close proximity of the mask layer to the adjacent etched layers 58, 76, even in the presence of the diffusing effect provided by the translucent transmission of light through these etched layers.

A second light source 84, which in this embodiment is a second light emitting diode (LED) 84, is mounted on the circuit board 46, located centrally behind the supporting frame 28 such that light emitted by the light source 84 passes through the opening in the rear face 40 of the supporting frame and through the pyramidal space 36 towards the second light transmitting substrate 70. Due to the angled inner faces 34 of the walls 30 of the supporting frame 28 and the resulting shape of the space 36, the light emitted by the second light source 84 is transmitted evenly over the whole area of the second light transmitting substrate 70.

The etched regions 58, 76 of the first and second light transmitting substrates 50, 70 are both translucent in transmission of light from the second light source across the respective rear and front surfaces 56, 74 of the first and second substrates 50, 70. Such transmitted light will be scattered, and this provides the benefit of diffusing the transmitted light, so that no other light diffuser is needed in front of the second light source 84.

An advantage of using the light pipe 54 for transmitting light from the first light source to the first light transmitting substrate 50 is that both the first and second light sources 62, 84 can be mounted on a common circuit board 46, while still maintaining the optical alignment during movement 5 of the button cover 16. Therefore, the display of the first graphic or the second graphic is not affected during the press movement 5 of the button 12.

When the second light source 84 is illuminated, the emitted light is transmitted through the second light transmitting substrate 70. The opaque regions 80 on the front surface 74 of the second light transmitting substrate 70 block the transmitted light in these regions, and the emitted light only passes through the non-printed regions 83 of the front surface 74 of the second light transmitting substrate 70 and then through the first light transmitting substrate 50 towards a user of the button 12. The emitted light passes through transparent or translucent regions of the cover 16 and in this way an illuminated image of the second graphic 82 is displayed to the user.

The etched regions 58 on the rear surface 56 of the first light transmitting substrate 50, which correspond to the first graphic 60, and the etched regions 76 on the front surface 74 of the second light transmitting substrate 70, which correspond to the inverse or negative 78 of the first graphic 60, are aligned so that these are in registration with each other. The combination of the aligned etched regions 58, 76, means that all the light from the second light source 84 that is not blocked by the mask layer 80 and which is transmitted through the second and first light transmitting substrates 70, 50, and which is therefore visible to a user of the device 10, has passed through one or the other of the etched regions 58, 76. The degree or amount of etching in the two etched regions 58, 76 is chosen so that the scattering by these regions in the transmission of light from the second light source 84 is substantially equal. In this way, the shape of the etched region forming the first graphic 60 is substantially concealed by the etched regions 76 of the second light transmissive substrate 70.

In addition, both the first graphic 60 and the second graphic 82 will be displayed with a similar or the same visual appearance or "texture", as in both cases the light reaching the viewer of the graphics is scattered by similarly etched areas 58, 76.

A particular benefit of the invention is the use of two similar substrates 50, 70, preferably formed in the same material, and having the same optical properties. This permits the etched areas (which may be formed using the same etching technique) to have the same forwards light scattering properties. The two similar substrates are also each sufficiently stable so that these keep the positive and negative etched regions 58, 76 in register with each other and this also makes it easier to bring these etched areas into close proximity with each other without touching, in order to minimize or eliminate any noticeable parallax effects between the aligned etched areas 58, 76.

A further benefit is that the apparent visible plane of the first and second graphics is substantially identical.

As such, when the second light source 84 is illuminated and the first light source 62 is switched off, an even illumination of the second graphic 82 is presented to a user, with no variation in illumination caused by the etched regions 58 of the first graphic 60. In this way the first graphic 60 is concealed or hidden when the second light source 84 is illuminated and the second graphic 82 is displayed.

If the negative or inverse etched regions 76 were not present then some of the light that passes through the second light transmitting substrate 70 to display the second graphic 82 would strike the etched regions 58 of the first light transmitting substrate 50, while some of the light would pass through the first light transmitting substrate 50 without striking the etched regions 58. This would lead to variations in the intensity of the light that is displayed caused by the etched regions 58 in the shape of the first graphic 60. In this way, the first graphic 60 would still be partially visible to a viewer of the display 10.

The first and second light sources 62, 84 may have the same spectral characteristics, for example both being the same type of white or colored LED. The light intensity from the two light sources may, of course, be different in order to account for different optical losses in the different optical paths, in particular the different relative efficiencies of scattering and transmission in the optical paths. It is also possible for the first and second light sources 62, 84 to have different colors, such that first and second graphics are presented in one or the other of the colors. All that is required is that the scattering from the etched regions 58, 76 on the first and second light transmissive substrates 50, 70 is matched for the light of the second light source 84 so that the first graphic 60 is concealed when the second graphic 82 is displayed.

Although in this embodiment the mask layer 80 is formed by printed regions 80 on the front surface 74 of the second light transmitting layer 70, in other embodiments, the mask layer 80 may be a separate layer. The mask layer 80 may be provided at any suitable location between the second light source 84 and the rear surface 56 of the first light transmitting substrate 50.

In this embodiment, the second light transmitting substrate 70 is parallel to but spaced apart from the display area 52 of the first light transmitting substrate 50 such that a minimal gap 86 exists between the rear surface 56 of the first light transmitting substrate 50 and the front surface 74 of the second light transmitting substrate 70. This gap 86, which in a preferred embodiment is an air gap 86, is required to prevent the etched regions 76 on the second light transmitting substrate 70 affecting the transmission of light within the display area 52 of the first light transmitting substrate 50. If the air gap 86 were not present and the front surface 74 of the second light transmitting substrate were in contact with the rear surface 56 of the display area 52, then the etched regions 76 would also cause light transmitted within the first light transmitting substrate 50 to be directed out of the front surface 68 of the first substrate 50, and the first graphic 60 would not be visible.

This design of display device 10 allows two graphics to be selectively displayed within the same display area 52, which may be part of a movable control such as a button as described above, or which may be part of a fixed display panel, such as a motor vehicle dashboard. FIG. 5 illustrates the relative positions of the first and second graphics 60, 82 on the front face 18 of the button 12 in the embodiment described above. Although, in this example, the first and second graphics 60, 82 have been shown as fully overlapping, it will be appreciated that in other embodiments of the invention the first and second graphics may only partially overlap or may not overlap at all, so that there may be instances when both graphics are displayed at the same time. All such embodiments are within the scope of the invention, so long as when the two graphics are displayed only one at a time, the etching of the surfaces of the first and second light transmissive substrates is that the first graphic is concealed when the second graphic is displayed.

During operation of the device 10, when it is desired to display the first graphic 60, the first light source 62 is illuminated and the second light source 84 is switched off. When it is necessary to display the second graphic 82, due to a change in function of the button 12, the first light source 62 is switched off and the second light source 84 is illuminated. In this way, either one of two graphics 60, 82 is illuminated depending on the current function of the button 12.

It will be understood that although the display device of the present invention has been described in relation to the display of graphics or symbols 60, 82 on a button 12, the display device 10 may also be used in other displays, especially when there is limited display area available. The display device 10 may be used, for example, in telephone handsets, in displays on household appliances, or in vehicle dashboards to display warning lights.

Therefore, the invention described above provides an improved means of displaying more than one graphic in a single display area, for example on a button, Because the optical system does not rely on color filters to display two different images of different color, but rather etched areas which do not select for color, the invention allows the different images to be displayed in any desired color, as determined by the spectral output of the two light sources. It is then possible to use light sources for which the color is controllably changeable, so that the color of the graphic can be changed in order to convey useful information to a user of the display device. An example of a light source for which the color of emitted light can be changed is an LED unit having red, green and blue LEDs packaged in a single unit. The invention also provides a compact display device, which is particularly useful in an automotive environment where the space available to display information to a driver or passenger is limited.

It is to be recognized that various alterations, modifications, and/or additions may be introduced into the constructions and arrangements of parts described above without departing from the spirit or scope of the present invention, as defined by the appended claims.

The invention claimed is:

1. A display device for displaying two graphics, the display device comprising:

a first light transmitting substrate having a front surface and a rear surface, and the first light transmitting substrate including, on its rear surface, at least one etched region corresponding to a first graphic to be displayed;

a second light transmitting substrate located behind and spaced apart from the first light transmitting substrate, the second light transmitting substrate having a front surface and a rear surface, and the second light transmitting substrate including, on its front surface, at least one etched region corresponding to a negative of the first graphic;

a first light source arranged to emit light into the first light transmitting substrate such that the first light transmitting substrate acts as a light pipe conveying said emitted light within the first light transmitting substrate to said at least one etched region;

a second light source positioned behind the second light transmitting substrate and arranged to emit light through the first and second light transmitting substrates towards a viewer of the display; and a mask layer comprising at least one opaque region, said at least one opaque region defining at least one light transmissive region corresponding to a second graphic to be displayed, the mask layer being provided between the second light source and the rear surface of the first light transmitting substrate;

wherein, in use, when the first light source is illuminated and the second light source is not illuminated, light conveyed within the first light transmitting substrate is incident on said etched region(s) on the rear surface of the first light transmitting substrate and is directed out of the front surface of the first light transmitting substrate thereby displaying only the first graphic to a viewer of the display, and when the second light source is illuminated and the first light source is not illuminated, light emitted by the second light source is blocked by said opaque region(s) of the mask layer and passes through said light transmissive region(s) and through the first and second light transmitting substrates thereby displaying only the second graphic to a viewer of the display, said passed light also passing through either the etched region(s) on the rear surface of the first light transmitting substrate or through the etched region(s) on the front surface of the of the second light transmitting substrate so that the first graphic is concealed when the second graphic is displayed.

2. A display device as claimed in claim 1, in which the light conveyed within the first light transmitting substrate is incident on said etched region(s) on the rear surface of the first light transmitting substrate and is scattered by said etched region(s) of the front surface of the first light transmitting substrate thereby displaying only the first graphic to a viewer of the display.

3. A display device as claimed in claim 1, in which the first light transmitting substrate and the second light transmitting substrate have substantially the same thickness between respective front and rear surfaces of said substrates.

4. A display device as claimed in claim 1, in which the first light transmitting substrate and the second light transmitting substrate are spaced apart with an air gap therebetween.

5. A display device as claimed in claim 1, in which the etched regions of the first light transmitting substrate and second light transmitting substrate are non-wavelength selective.

6. A display device as claimed in claim 1, in which the mask layer is located between the front surface of the second light transmitting substrate and the rear surface of the first light transmitting substrate.

7. A display device as claimed in claim 1, in which said at least one opaque region is provided by a layer on a region of the front surface of the second light transmitting substrate.

8. A display device as claimed in claim 7, in which the mask layer comprises opaque printed regions.

9. A display device as claimed in claim 1, in which said at least one opaque region is black.

10. A display device as claimed in claim 1, in which the mask layer overlies some but not all of said at least one etched region on the front surface of the second light transmitting substrate.

11. A display device as claimed in claim 1, in which said etched regions of the first light transmitting substrate and of the second light transmitting substrate are areas of roughened surface.

12. A display device as claimed in claim 1, in which the first and second light transmitting substrates are parallel.

13. A display device as claimed in claim 1, in which the first light transmitting substrate is planar and is connected to a light pipe extending perpendicular to the first light transmitting substrate for conveying light from the first light source to the first light transmitting substrate.

14. A display device as claimed in claim 1, in which the display device further comprises a transparent or translucent cover in front of the first light transmitting substrate.

15. A push button including a display device, the display device comprising:

a first light transmitting substrate having a front surface and a rear surface, and the first light transmitting substrate including, on its rear surface, at least one etched region corresponding to a first graphic to be displayed, the first graphic representing a first function of the button;

a second light transmitting substrate located behind and spaced apart from the first light transmitting substrate, the second light transmitting substrate having a front surface and a rear surface, and the second light transmitting substrate including, on its front surface, at least one etched region corresponding to a negative of the first graphic;

a first light source arranged to emit light into the first light transmitting substrate such that the first light transmitting substrate acts as a light pipe conveying said emitted light within the first light transmitting substrate to said at least one etched region;

a second light source positioned behind the second light transmitting substrate and arranged to emit light through the first and second light transmitting substrates towards a viewer of the display; and a mask layer comprising at least one opaque region, said at least one opaque region defining at least one light transmissive region corresponding to a second graphic to be displayed, the mask layer being provided between the second light source and the rear surface of the first light transmitting substrate and the second graphic representing a second function of the button;

wherein, in use, when the first light source is illuminated and the second light source is not illuminated, light conveyed within the first light transmitting substrate is incident on said etched region(s) on the rear surface of the first light transmitting substrate and is directed out of the front surface of the first light transmitting substrate thereby displaying only the first graphic to a viewer of the display, and when the second light source is illuminated and the first light source is not illuminated, light emitted by the second light source is blocked by said opaque region(s) of the mask layer and passes through said light transmissive region(s) and through the first and second light transmitting substrates thereby displaying only the second graphic to a viewer of the display, said passed light also passing through either the etched region(s) on the rear surface of the first light transmitting substrate or through the etched region(s) on the front surface of the of the second light transmitting substrate so that the first graphic is concealed when the second graphic is displayed.

* * * * *